United States Patent
Berger

(10) Patent No.: US 12,337,777 B2
(45) Date of Patent: Jun. 24, 2025

(54) MOTOR VEHICLE AND METHOD FOR OPERATING A MOTOR VEHICLE

(71) Applicant: AUDI AG, Ingolstadt (DE)

(72) Inventor: Johann Berger, Reischach (DE)

(73) Assignee: AUDI AG, Ingolstadt (DE)

(*) Notice: Subject to any disclaimer, the term of this patent is extended or adjusted under 35 U.S.C. 154(b) by 170 days.

(21) Appl. No.: 18/354,350

(22) Filed: Jul. 18, 2023

(65) Prior Publication Data
US 2024/0067113 A1    Feb. 29, 2024

(30) Foreign Application Priority Data
Aug. 29, 2022 (DE) .................. 10 2022 121 749.3

(51) Int. Cl.
*B60R 21/0134* (2006.01)
*B60J 5/04* (2006.01)
(Continued)

(52) U.S. Cl.
CPC .......... *B60R 21/0134* (2013.01); *B60J 5/047* (2013.01); *B60J 5/107* (2013.01); *B60J 10/86* (2016.02);
(Continued)

(58) Field of Classification Search
CPC ........ B60R 21/0134; B60R 1/22; B60J 5/047; B60J 5/107; E05B 77/12; E05B 77/02; E05Y 2900/546; E05F 15/40
See application file for complete search history.

(56) References Cited

U.S. PATENT DOCUMENTS

| 9,834,164 B1 | 12/2017 | Iyer et al. |
| 11,199,039 B2 | 12/2021 | Zander et al. |

(Continued)

FOREIGN PATENT DOCUMENTS

| CN | 113412361 A * | 9/2021 |
| DE | 102007034556 A1 | 1/2009 |

(Continued)

OTHER PUBLICATIONS

Chen et al., A Vehicle Door Control Method, Device, Vehicle Door and Vehicle (Year: 2021) (CN-113412361-A and English translation of CN-113412361-A).*

*Primary Examiner* — Kito R Robinson
*Assistant Examiner* — Roy Rhee
(74) *Attorney, Agent, or Firm* — Sterne, Kessler, Goldstein & Fox P.L.L.C.

(57) ABSTRACT

A motor vehicle includes a body component and a wing element pivotably coupled to the body component such that the wing element pivots relative to the body component about a pivot axis between a neutral starting position and a first pivot position. A control device of the motor vehicle detects an impending collision of the motor vehicle with a collision object located in the surroundings of the motor vehicle. Upon detecting the impending collision, the control device automatically pivots the wing element toward the body component from the neutral starting position to the first pivot position. The control device of the motor vehicle evaluates a severity of the collision and, depending upon the severity, automatically pivots the wing element away from the body component from the first pivot position to the neutral starting position.

10 Claims, 3 Drawing Sheets

(51) Int. Cl.

| | | |
|---|---|---|
| *B60J 5/10* | (2006.01) | |
| *B60J 10/86* | (2016.01) | |
| *B60R 21/02* | (2006.01) | |
| *B62D 25/12* | (2006.01) | |
| *E05B 77/12* | (2014.01) | |
| *E05F 15/72* | (2015.01) | |
| *B60R 21/01* | (2006.01) | |

(52) U.S. Cl.
 CPC .............. *B62D 25/12* (2013.01); *E05B 77/12* (2013.01); *E05F 15/72* (2015.01); *B60R 2021/01252* (2013.01); *B60R 2021/0273* (2013.01); *E05Y 2900/531* (2013.01); *E05Y 2900/536* (2013.01); *E05Y 2900/546* (2013.01)

(56) References Cited

U.S. PATENT DOCUMENTS

| | | | |
|---|---|---|---|
| 11,530,568 | B2 | 12/2022 | Battlogg |
| 2010/0270813 | A1 | 10/2010 | Roth et al. |
| 2019/0152426 | A1* | 5/2019 | Szente ................... E05B 77/08 |
| 2020/0190869 | A1 | 6/2020 | P et al. |
| 2023/0077070 | A1* | 3/2023 | Yates ....................... B60K 1/04 |

FOREIGN PATENT DOCUMENTS

| | | |
|---|---|---|
| DE | 202017105031 U1 | 10/2017 |
| DE | 102017116814 A1 | 2/2018 |
| DE | 102019115669 A1 | 6/2020 |
| DE | 102019121638 A1 | 12/2020 |
| DE | 102020132906 A1 | 6/2022 |

\* cited by examiner

MOTOR VEHICLE AND METHOD FOR OPERATING A MOTOR VEHICLE

TECHNICAL FIELD

The invention relates to a motor vehicle having a body or a body component and at least one wing element—in particular, a trunk lid. The wing element is held on the body component so as to be pivotable about a pivot axis between a neutral starting position and at least one further pivot position, relative to the body component. The invention also relates to a method for operating such a motor vehicle.

BACKGROUND

It is known to equip motor vehicles with movable cover elements or wing elements in order to make various interior spaces of the motor vehicle selectively accessible. Such a wing element can, for example, be a side door of the motor vehicle, a luggage compartment lid or trunk lid of the motor vehicle, or also an engine hood. As is known, such a wing element is held on the body component so as to be pivotable about a pivot axis, relative to a body component of the motor vehicle.

In addition, so-called active hood systems are known from the prior art, wherein a position of an engine hood of a motor vehicle, relative to a body component, e.g., relative to a front cross member, can be adjusted in such a way that a distance between the engine hood and the body component is increased compared to an initial state. In this connection, for example, DE 10 2019 115 669 A1 describes an engine hood locking release that is predictively triggered by an automatic recognition of an unprotected object. From DE 10 2017 116 814 A1, an impact sensor arrangement for an active hood system of a motor vehicle is known. Here, the engine hood is raised as a result of a detected collision of the motor vehicle with a collision object. A locking device for the front hood of a motor vehicle is generally known from DE 10 2007 034 556 A1, wherein the front hood is displaceable, relative to the locking device, via a guide device.

The known predictive systems result in the disadvantage that the engine hood remains in the raised or lifted state after the predicted collision, or even after the collision has taken place. This prevents further travel of the motor vehicle—in particular, after only minor collisions. This can lead to the active skin system being deliberately deactivated or not used. As a result, general traffic safety can be adversely affected.

SUMMARY OF INVENTION

The object of the invention according to the present disclosure is to increase the general traffic safety.

The object is achieved by the embodiments described herein. Additional developments of the invention are described by the following description and the figures.

The invention according to an embodiment provides a motor vehicle which has a body component and at least one wing element. The wing element is held on the body component so as to be pivotable about a pivot axis relative to the body component between a neutral starting position and at least one further pivot position. The wing element is in particular held in a continuously pivotable manner on the body component, at least indirectly, in particular directly. The wing element can be a side door, an engine hood, or also a trunk lid of the motor vehicle. In other words, the wing element thus serves to make a respective interior of the motor vehicle selectively accessible. In other words, the wing element serves to open and close an opening of an interior of the motor vehicle—for example, a motor vehicle passenger compartment, a motor compartment, or also a trunk of the motor vehicle.

The neutral starting position can be a closed position of the wing element, wherein, in the closed position, an opening of the motor vehicle to be closed by the wing element is closed. The at least one further pivot position can be a partially or completely open position of the wing element. The at least one further pivot position can also be an over-pressed position, relative to the neutral starting position, in which the wing element is pressed and/or pulled further towards the body component than in the neutral starting position.

Preferably, a respective pivot position can be adjusted continuously, and the wing element can be fixed in the respective pivot position. This relates not only to the completely closed and the completely open pivot positions, but also to any intermediate pivot positions and/or the described over-pressed position.

According to an embodiment of the invention, the motor vehicle has a control device which is designed to receive a signal describing the surroundings of the motor vehicle from at least one environment sensor, e.g., a camera sensor, of the motor vehicle and to detect an impending collision of the motor vehicle with a collision object in the surroundings of the motor vehicle on the basis of the signal and at least one current journey parameter of the motor vehicle. In other words, the motor vehicle according to an embodiment of the invention can therefore comprise an environment sensor system which is connected to the control device of the motor vehicle by means of a communications connection. The at least one environment sensor can be a camera sensor, a radar sensor, a lidar sensor, or the like. The sensor is designed to detect the collision object in the surroundings of the motor vehicle. The information or the signal concerning the detected collision object can then be transmitted from the sensor or a superordinate sensor device to the control device of the motor vehicle.

According to an embodiment of the invention, the control device is designed to automatically control actuators of the motor vehicle—in particular, of the wing element—when the imminent collision is detected, in such a way that the wing element, starting from the neutral starting position, is pulled into the at least one further pivot position in the direction of the body component. The control device is therefore designed to calculate, e.g., on the basis of a current travel speed, that a collision with the detected collision object threatens. The current travel speed of the motor vehicle can thus serve as the current journey parameter. As soon as the control device has detected that a collision is imminent or threatens, the control device can automatically pull the wing element, starting from the neutral starting position, towards the body component. If the wing element is a trunk lid of the motor vehicle, a distance between a cross member of the motor vehicle and the trunk lid can thereby be increased in such a way that a possible contact of the trunk lid with the collision object can be prevented.

According to the invention, the control device of the motor vehicle is further designed to evaluate a severity of the collision and, depending upon the severity, to automatically control the actuators in such a way that the wing element, starting from the at least one further pivot position, is pushed away from the body component again in order to restore the neutral starting position. In other words, after the collision, the wing element does not remain in the pivot position pulled towards the body component, but, if the severity of the collision allows this, is automatically pushed back again into the neutral starting position by the control device. The severity of the collision can be evaluated by the control device with values between 0 and 1, where 0 corresponds to the absence of the threatening collision, and where 1 corresponds to such a serious collision that further travel of the motor vehicle is prevented. In the case of the value 1, for example, the above-mentioned cross member of the motor vehicle can be deformed in such a way that a restoration of the neutral starting position of the wing element with respect to the cross member is no longer possible.

In order to evaluate the severity of the collision, the control device can receive and evaluate signals from deformation sensors arranged along the body of the motor vehicle, for example.

The invention according to an embodiment provides the advantage that further travel is possible after a minor collision. As a result, an inhibition threshold is, advantageously, reduced, making use of the existing predictive lid retraction system. This advantageously increases the general traffic safety.

The invention also includes embodiments which result in additional advantages.

One embodiment provides that the signal describing the surroundings relate to a current distance of the collision object from the motor vehicle, wherein the control device activates the actuators for establishing the at least one further pivot position only when the distance falls below a predetermined threshold value. In other words, the imminent collision of the motor vehicle with the collision object is detected only when the distance between the motor vehicle and the collision object falls below a predetermined threshold value or minimum distance. This avoids disproportionately early activation or triggering of the actuators.

A further embodiment provides that the control device holds the wing element in the at least one further pivot position by correspondingly controlling the actuators and activate the actuators for restoring the neutral starting position, starting from the at least one further pivot position, only when the distance reaches or exceeds the predetermined threshold value again. In other words, the control device re-establishes the neutral starting position only when the motor vehicle is sufficiently far away from the collision object. This advantageously prevents premature restoration of the neutral starting position.

According to a further embodiment, the control device is designed to hold the wing element in the at least one further pivot position and to activate the actuators for restoring the neutral starting position, starting from the at least one further pivot position, only after a manual user release. For this purpose, a previous query of a user release can be carried out by a motor vehicle information system. This results in the advantage that a user of the motor vehicle has the opportunity to prevent the restoration of the neutral starting position.

A further embodiment provides that a compressible expansion element be arranged on the motor vehicle in such a way that it is compressed in the at least one further pivot position, relative to the neutral starting position, and exerts a restoring force on the wing element corresponding to the compression, wherein the restoring force assists in restoring the neutral starting position.

The expansion element is preferably a compressible sealing lip between the wing element and the body component. This can, for example, be a chambered seal with one, two, or more than two chambers. The expansion element has the advantage that the control device does not have to actively set the actuators in motion for restoring the neutral starting position, but that it is sufficient if the control device releases a locking of the actuators in the at least one further pivot position.

A further embodiment provides that the motor vehicle have a closure device. In this case, a first closure element of the closure device is arranged on the wing element, and a second closure element, designed to correspond to the first closure element, of the closure device is arranged on the body component. The first closure element can be a lock hook, and the second closure element can be a latch clip which is designed to correspond to the lock hook. The closure device can be a so-called self-retraction lock. In this case, the actuators can be designed to be controlled by the control device in such a way that, by alternately establishing a neutral position and at least one further closure position of the closure elements relative to one another, they move the wing element back and forth between the neutral starting position and the at least one further pivot position and hold it in the respective pivot position.

The self-retraction lock is preferably configured with an additional travel path. In other words, it can be provided that the self-retraction lock also be able to be moved as a whole, relative to the body component, by way of the above-described possibility of producing different closure positions of lock hooks and lock brackets. This advantageously results in an enlarged clearance between the neutral starting position and the at least one further pivot position.

Preferably, the wing element is a side door of the motor vehicle, an engine hood of the motor vehicle, and/or a trunk lid of the motor vehicle.

The motor vehicle according to an embodiment of the invention is preferably designed as an automobile, in particular as a passenger car or a truck, or as a passenger bus or a motorcycle.

Another embodiment of the invention also relates to a method for operating a motor vehicle, wherein the motor vehicle has a body component and at least one wing element, wherein the wing element is held on the body component so as to be pivotable about a pivot axis between a neutral starting position and at least one further pivot position, relative to the body component. A control device of the motor vehicle receives a signal describing a surroundings of the motor vehicle from at least one environment sensor of the motor vehicle. The control device then recognizes an impending collision of the motor vehicle with a collision object in the surroundings of the motor vehicle on the basis of the signal and at least one current journey parameter of the motor vehicle. When the imminent collision is detected, the control device automatically controls actuators of the wing element in such a way that the wing element, starting from the neutral starting position, is initially pulled into the at least one further pivot position in the direction of the body component.

According to the invention, the control device of the motor vehicle evaluates a severity of the collision and, depending upon the severity, automatically controls the actuators in such a way that the wing element, starting from the at least one further pivot position, is pushed away from the body component in order to restore the neutral starting position. In other words, after activation by the control device, the actuators push the wing element, starting from the at least one further pivot position, away from the body component in order to restore the neutral starting position.

For applications or application situations which may arise in the method and which are not explicitly described here, it can be provided that, according to the method, an error message and/or a request to input a user feedback be output and/or a standard setting and/or a predetermined initial state be set.

The invention also includes developments of the method according to the invention which have features that have already been described in connection with the developments of the motor vehicle according to the invention, and vice versa. For this reason, the corresponding developments of the method according to the invention are not described again here.

Another embodiment of the invention also includes the control device for the motor vehicle. The control device can have a data processing device or a processor device which is configured to implement an embodiment of the method according to the invention. For this purpose, the processor device can have at least one microprocessor, and/or at least one microcontroller, and/or at least one FPGA (field programmable gate array), and/or at least one DSP (digital signal processor). Furthermore, the processor device may comprise program code which, when executed by the processor device, is configured to implement the embodiment of the method according to an embodiment of the invention. The program code can be stored in a data storage device of the processor unit. A processor circuit of the processor device can have, for example, at least one circuit board and/or at least one SoC (system on chip).

As a further achievement, the invention also comprises a computer-readable storage medium comprising instructions which, upon execution by a computer or a computer network, cause this to execute the method according to an embodiment of the invention. The storage medium can, for example, be configured at least in part as a non-volatile data storage (e.g., as flash memory and/or as an SSD—solid state drive) and/or at least in part as a volatile data storage (e.g., as a RAM—random access memory). However, the storage medium can also be operated as a so-called Appstore Server on the Internet, for example. A processor circuit with at least one microprocessor can be provided by the computer or computer network. The commands can be provided as binary code or assembly, and/or as a source code of a programming language (e.g., C).

The invention also comprises the combinations of the features of the described embodiments. The invention according to an embodiment therefore also comprises implementations which each have a combination of the features of several of the described embodiments, provided the embodiments have not been described as mutually exclusive.

BRIEF DESCRIPTION OF THE FIGURE

In the following, exemplary embodiments of the invention are described. In the figures.

DETAILED DESCRIPTION OF THE FIGURE

The exemplary embodiments described below are preferred embodiments of the invention. In the exemplary embodiments, the described components of the embodiments each represent individual features of the invention that are to be considered independently of one another, each also further developing the invention independently of one another. For this reason, the disclosure is also intended to include other combinations of the features of the embodiments than those described. Additionally, the described embodiments can also be complemented by additional, already described features of the invention.

In the figures, the same reference signs refer to functionally identical elements.

Figure 1:
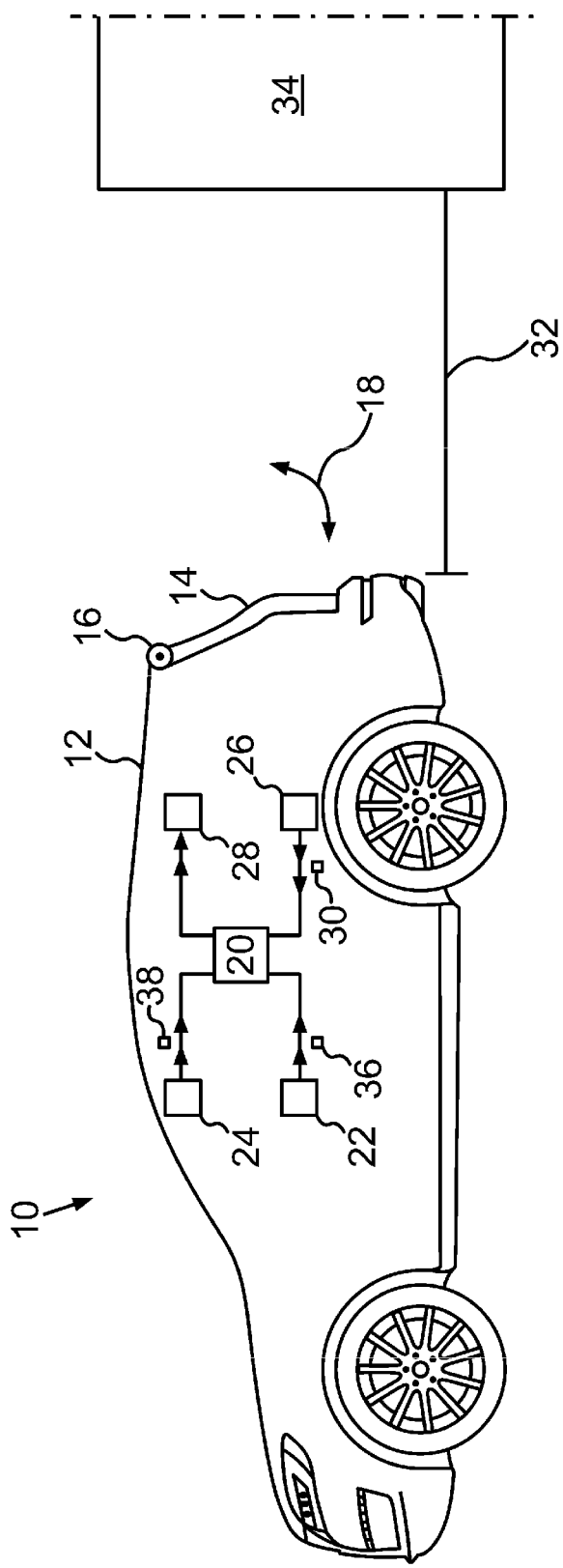
FIG. 1 shows a schematic representation of a motor vehicle according to an embodiment of the invention.

FIG. 1 shows a motor vehicle 10 having a body component 12 and a wing element 14. The wing element 14 is held on the body component 12 so as to be pivotable about a pivot axis 16, relative to the body component 12. The wing element 14 shown in FIG. 1 is designed as a trunk lid of the motor vehicle 10. It is held pivotably about a pivot axis 16 arranged in the upper rear roof region of the motor vehicle 10—for example, by means of a hinge. A pivoting of the wing element 14 leads to a displacement of the wing element 14 along the pivoting direction 18. The wing element 14 can be pivoted between at least two pivot positions, relative to the body component 12. One of the pivot positions can be a neutral starting position or a closed position of the trunk lid 14 shown here.

The motor vehicle 10 of FIG. 1 also has a control device 20 which operates communications connections to at least one motor controller 22, a user interface 24, at least one environment sensor 26, and an actuator 28. The control device 20 can be designed to receive a signal 30 describing the surroundings of the motor vehicle 10 from the environment sensor 26. The signal 30 can describe a current distance 32 between the motor vehicle 10 and a collision object 34. At the same time, the control device can be designed to receive at least one current journey parameter 36, e.g., a current travel speed of the motor vehicle 10, from the motor controller 22. The control device 20 can be designed to detect an impending collision of the motor vehicle 10 with the collision object 34 from the signal 30 and the journey parameter 36. The control device 20 can also be designed to automatically control the at least one actuator 28, when the imminent collision is detected, in such a way that the wing element 14, starting from the neutral starting position, is pulled into the at least one further pivot position in the direction of the body component 12. By pulling the wing element 14 towards the body component 12, damage to the wing element 14 can be prevented during the imminent collision.

The control device 20 can evaluate a severity of the collision on the basis of signals from deformation sensors, not shown here, of the motor vehicle 10. Depending upon the severity, the control device 20 can control the actuators 28 in such a way that the wing element 14 is automatically pushed back from the body component 12 into the neutral starting position.

According to a preferred embodiment, the control device 20 can be designed to receive, alternatively or additionally, a confirmation signal 38 which may have been input by a user of the motor vehicle 10 via the user interface 24. The activation of the actuator 28 can be made dependent upon whether or not the confirmation signal 38 is present. The confirmation signal 38 can be a release signal that allows the activation of the actuators 28 for restoring the neutral starting position.

Figure 2:
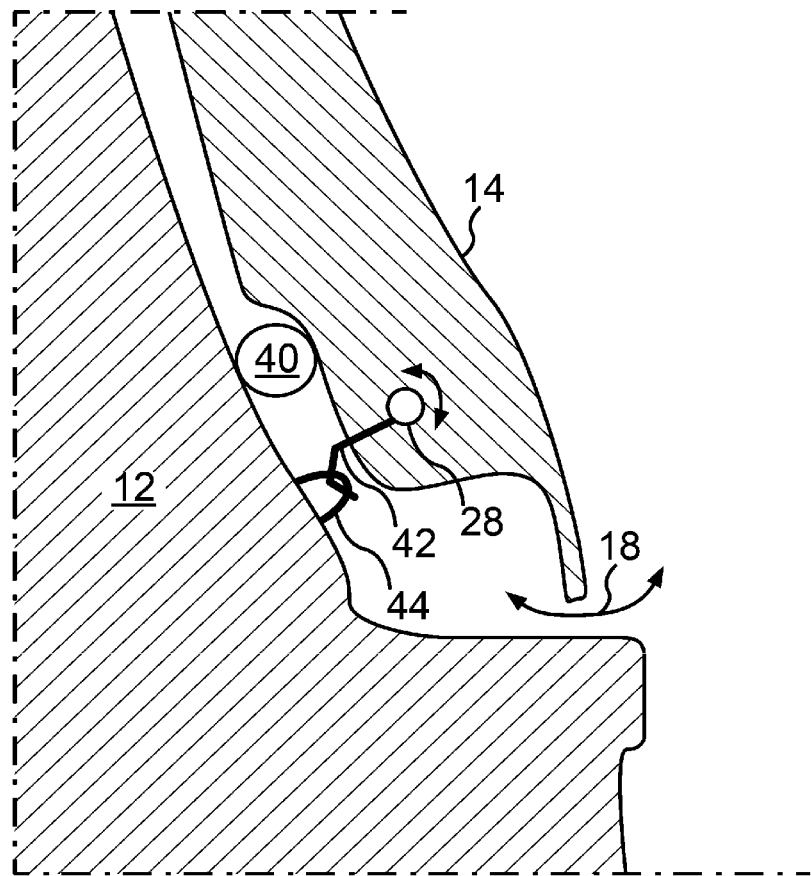
FIG. 2 is a schematic detail view of a connection region between a wing element and a body component according to an embodiment of the invention.

With reference to the components shown and described in connection with FIG. 1, FIG. 2 shows a detail view of the connection region between the wing element 14 and the body component 12. In the illustration shown here, an expansion element 40 is arranged between the wing element 14 and the body component 12. The expansion element 40 can be a compressible sealing lip.

The pivot position of the wing element 14 shown in FIG. 2 corresponds to the neutral starting position, wherein the expansion element 40 is in a non-compressed state in the neutral starting position. Activation of the actuator 28 can, starting from the position shown here, lead to the latter performing a rotation of the first closure element 42 in a counter-clockwise direction, so that the closure element 42 continues to engage with the second closure element 44. In other words, an activation of the actuator 28 can result in an increased engagement of the first closure element 42 or the lock hook with the second closure element 44 or with the lock hoop. As a result, the wing element 14 is pulled in the direction of the body component 12 towards the latter. As a result, the at least one further pivot position can be established, wherein, in the at least one further pivot position, the expansion element 40 is compressed. If the actuator 28 is subsequently released again, e.g., by means of a corresponding confirmation signal 38, decompression of the compressed expansion element 40 can assist in restoring the neutral starting position.

Figure 3:
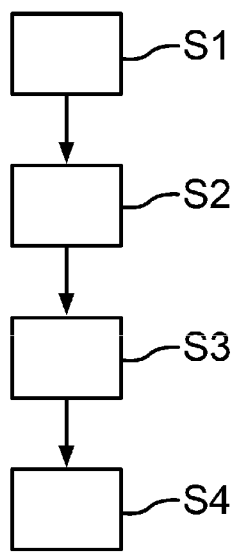
FIG. 3 is a schematic view of a method for operating a motor vehicle according to an embodiment of the invention.

FIG. 3 shows a schematic representation of a method for operating a motor vehicle 10 with reference to the components denoted and described in connection with FIGS. 1 and 2. The motor vehicle 10 has a body component 12 and at least one wing element 14, wherein the wing element 14 is held on the body component 12 so as to be pivotable about a pivot axis 16 between a neutral starting position and at least one further pivot position, relative to the body component 12. In a method step S1, a control device 20 of the motor vehicle 10 receives a signal 30 describing a surroundings of the motor vehicle 10 from at least one environment sensor 26 of the motor vehicle 10. In a step S2, the control device 20 receives at least one current journey parameter 36 of the motor vehicle 10 and detects an impending collision of the motor vehicle 10 with a collision object 34 in the surroundings of the motor vehicle 10 on the basis of the signal 30 and the at least one current journey parameter 36. In a step S3, when the imminent collision is detected, the control device 20 automatically controls actuators 28 of the wing element 14 in such a way that the wing element 14, starting from a neutral starting position, is initially pulled into the at least one further pivot position in the direction of the body component 12. In a step S4, the control device 20 of the motor vehicle 10 evaluates a severity of the collision and, depending upon the severity, automatically controls the actuators 28 in such a way that the wing element 14, starting from the at least one further pivot position, is pushed away from the body component 12 in order to restore the neutral starting position.

Overall, the examples show how a predictive trunk lid retraction with an integrated reset function can prevent damage to a vehicle trunk lid in a low-speed crash.

The invention claimed is:

1. A motor vehicle comprising:
a body component;
a wing element pivotably coupled to the body component such that the wing element is configured to pivot relative to the body component about a pivot axis between a neutral starting position and a first pivot position;
an actuator configured to pivot the wing element about the pivot axis between the neutral position and the first pivot position;

an environment sensor configured to transmit a signal indicating a state of surroundings of the motor vehicle; and
a control device configured to receive the signal from the environment sensor and to detect an impending collision of the motor vehicle with a collision object located in the surroundings of the motor vehicle based on the signal from the environment sensor and a current journey parameter of the motor vehicle,
wherein if the impending collision is detected, the control device is configured to control the actuator such that the wing element pivots toward the body component from the neutral starting position to the first pivot position, and
wherein the control device is further configured to evaluate a severity of the impending collision and, based on the evaluation of the severity, to control the actuator such that the wing element pivots away from the body component from the first pivot position toward the neutral starting position.

2. The motor vehicle according to claim 1, wherein the signal indicating the state of the surroundings of the motor vehicle indicates a current distance of the collision object from the motor vehicle, and wherein the control device is further configured to control the actuator to pivot to the first pivot position only when the current distance falls below a predetermined threshold value.

3. The motor vehicle according to claim 2, wherein the control device is further configured to hold the wing element at the first pivot position and to control the actuator to pivot the wing element from the first pivot position to the neutral starting position only when the current distance reaches or exceeds the predetermined threshold value again.

4. The motor vehicle according to claim 1, wherein the control device is further configured to hold the wing element at the first pivot position and to control the actuator to pivot the wing element from the first pivot position to the neutral starting position only after a manual user release.

5. The motor vehicle according to claim 1, further comprising:
a compressible expansion element compressed between the wing element and the body component when the wing is set at the first pivot position, wherein the compressible expansion element is configured to apply a restoring force against the wing element set at the first pivot position such that the restoring force assists in pivoting the wing element to the neutral starting position.

6. The motor vehicle according to claim 5, wherein the expansion element comprises a compressible sealing lip disposed between the wing element and the body component.

7. The motor vehicle according to claim 1, further comprising:
a closure device comprising a first closure element disposed on the wing element and a second closure element disposed on the body component, wherein the first closure element is configured to engage the second closure element at a closure position such that the wing element is locked at the first pivot position,
wherein the control device is further configured to control the actuator to pivot the wing element back and forth to release the first closure element from the closure position to a neutral position such that the wing element is free to pivot to the neutral starting position.

8. The motor vehicle according to claim 7, wherein the closure device further comprises a self-retraction lock.

9. The motor vehicle according to claim 1, wherein the wing element comprises one of the following: a side door of the motor vehicle, an engine hood of the motor vehicle, or a trunk lid of the motor vehicle.

10. A method for operating a motor vehicle, wherein the motor vehicle includes a body component and a wing element pivotably coupled to the body component such that the wing element is configured to pivot relative to the body component about a pivot axis between a neutral starting position and a first pivot position, the method comprising:
   receiving, by a control device of the motor vehicle, a signal from an environment sensor of the motor vehicle, wherein the signal indicates a state of surroundings of the motor vehicle;
   detecting, by the control device, an impending collision of the motor vehicle with a collision object located in the surroundings of the motor vehicle based on the signal from the environment sensor and a current journey parameter of the motor vehicle;
   controlling, by the control device, an actuator of the motor vehicle such that the wing element pivots toward the body component from the neutral starting position to the first pivot position;
   evaluating, by the control device, a severity of the impending collision; and
   controlling, by the control device, the actuator based on the evaluation of the severity such that the wing element pivots away from the body component from the first pivot position to the neutral starting position.

* * * * *